United States Patent Office 3,437,028
Patented Apr. 8, 1969

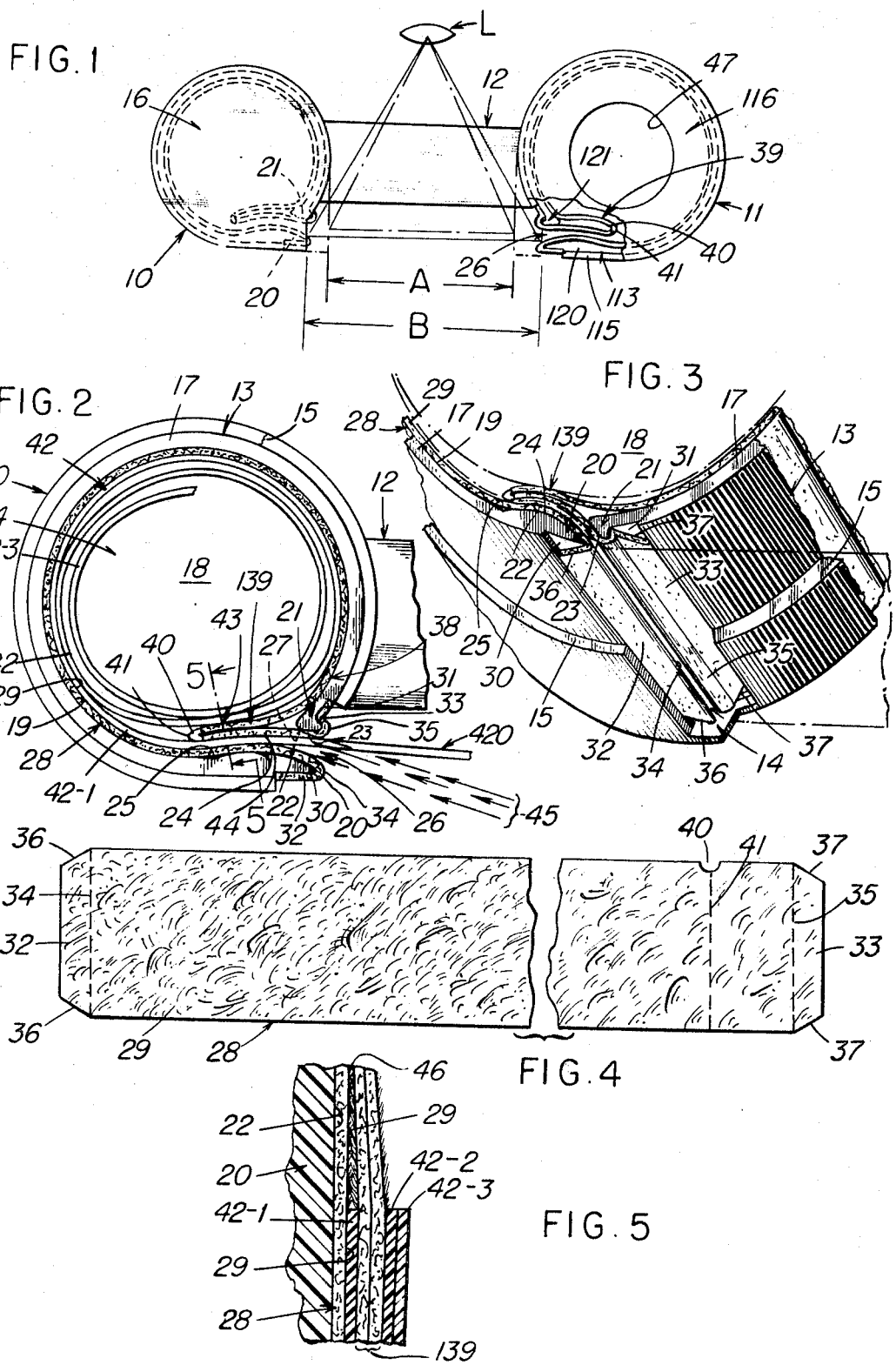

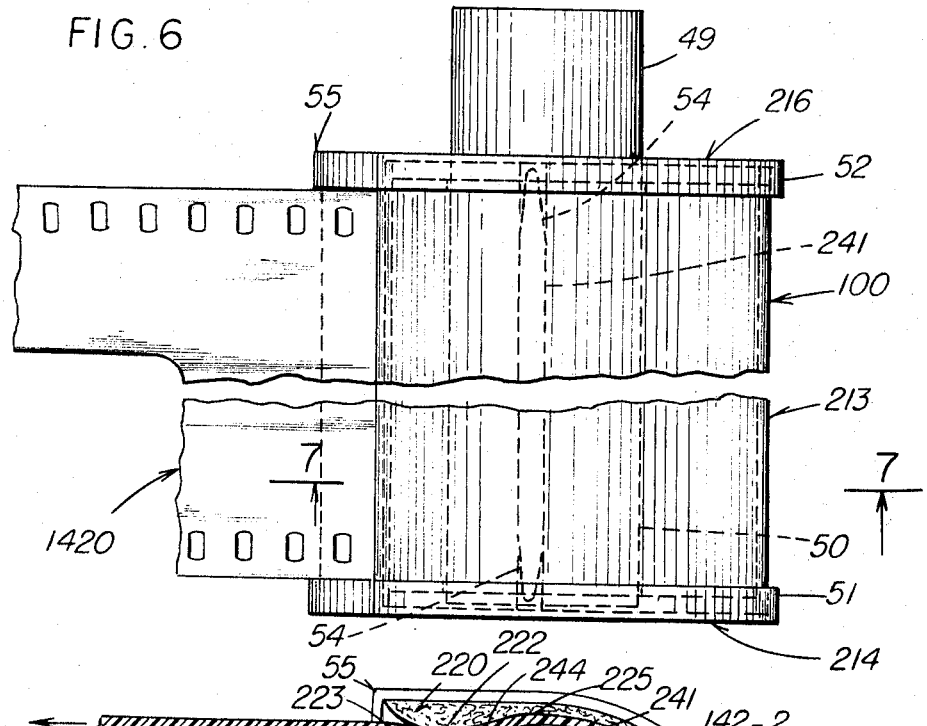
FIG. 6
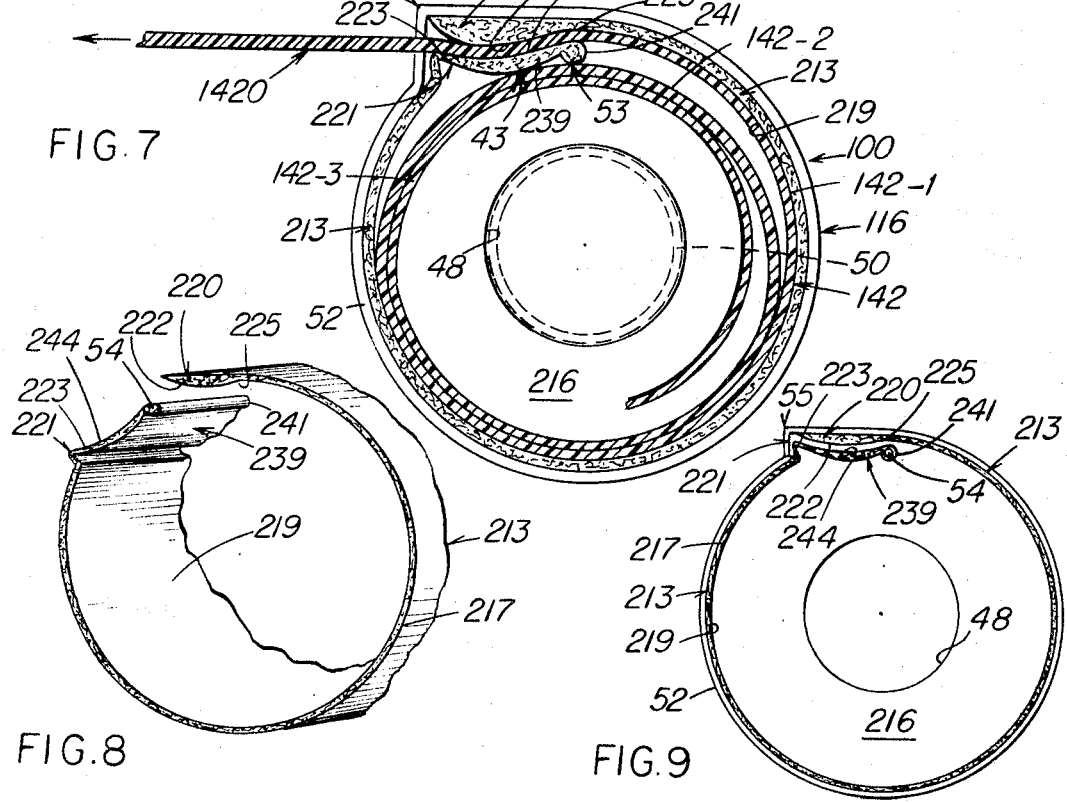
FIG. 7
FIG. 8
FIG. 9

3,437,028
PHOTOGRAPHIC FILM CASSETTES AND
PARTS THEREOF
Orests B. Berlings, 7501 Ridge Blvd.,
Brooklyn, N.Y. 11209
Filed Jan. 25, 1967, Ser. No. 611,654
Int. Cl. G03b 17/26
U.S. Cl. 95—67        8 Claims

ABSTRACT OF THE DISCLOSURE

Embodiments of a cassette housing for storage of a rolled strip of photographic negative film in the generally cylindrical chamber thereof with blockage of ingress of light rays through a film passage slot defined in the curvilinear sidewall by a pair of circumferentially-spaced and opposed lips. Such blockage is effected by curving the intervening slot from its exterior mouth progressively inward along a path which is convexly opposed to an arcuate margin of the chamber, and swingably mounting to the inward edge of one lip an inside tip member that has a concave face complementally opposed to a convexed face of the other lip together defining the sides of the curved slot for swingable snugging of this concaved tip member by film roll biasing against the film end extending out through this curved slot.

Background of the invention

The present invention relates to photographic film cassettes designed for light excluding storage of rolls of strips of photographic negative film and for loading the latter in unexposed condition into cameras.

Prior to the present invention it has been proposed to provide double chamber cassette structures with each of the latter designed to store in light-excluding manner in one chamber thereof a rolled strip of unexposed negative film as a supply means and to load it into a camera for successive exposure of consecutive frames thereof as it is progressively fed to the other chamber as a take-up means. It has also been proposed to provide a single chamber cassette for supply of a roll of wider unexposed negative film into a camera for such successive exposure of consecutive frames as it is fed step-by-step into a suitable take-up chamber in the camera and, after exposure, if desired, then transferred back to this cassette chamber for removal from the camera and storage until developed. Various types of light-traps have been proposed for such cassette chambers which are designed to exclude ingress of light rays into these film storage chambers that may otherwise fog the film, such as those of the Berlings U.S. Patents Nos. 2,983,462 and 3,159,357. While some of such proposals have proven to be effective in some respects for this purpose they have ignored some attendant problems and solutions thereof, as well as the desirable attainment of associated advantages. It is an object of the present invention to provide improved cassette structures which efficiently attain the desired blockage of ingress of light rays into the chamber of each, more particularly through top and bottom edges of the film passage slot.

Various forms of the present invention define the film passage slot between the opposed inner side faces of a pair of circumferentially-spaced, opposed and longitudinally-extending first and second lips embodied in the circumambient or curvilinear sidewall of the generally cylindrical cassette chamber. The inner side face of this first lip extends generally tangentially from and is merged with the arcuately curved inside face of this chamber, and it embodies a longitudinally-extending, transversely-curved, relatively wide raised land extending generally parallel to the axis of the chamber with this land being of relatively low height at its crown. The sloping inward side of this convexed land is located within the chamber and defines with the curved inside face of the sidewall of the latter at the mergence thereof a longitudinally-extending, shallow recess. The inner side face of the second lip is opposed to and spaced from a longitudinal zone of the convexed surface of this land with the intervening slot having a flared mouth at its outer end and a constricted throat inwardly of this mouth out through which extends a terminal end portion of the outer turn of a roll of film housed in the chamber.

The inward side of the second lip supports within the chamber a longitudinally-extending, inwardly directed, swingable tip member of a longitudinal width at least equal to, and preferably greater than, the width of the housed freshly cut film. This tip member has a transversely concaved face arranged complementary to the sloping inward side of the convexed land carried on the face of the first lip with the inward end edge of this tip member extending inwardly in the chamber at least to the vicinity of a portion of the shallow recess. The terminal end portion of the outside turn of the roll of negative film strip which is housed as a roll thereof within the chamber is located between the opposed fibrous facings of the first lip including its raised land and of the second lip and the concave face of the tip member swingably supported by this second lip with another portion of this outside film turn within the chamber bearing against the back side of the tip member opposite its concave face. Since negative film when curled or rolled up tends to uncurl or unroll when unconfined this outside film turn alone, or together with any additional film turns thereof located within this outside turn, biases the concave face of the swinging tip member toward the opposed convexed land to engage their fibrous faces snugly against opposite side faces of the intervening film strip end portion. In performing this action the swung tip member extends across and behind the throat of the slot effectively to block off ingress of light rays into the chamber through the film passage slot. This film passage slot is thus curved progressively inward along a path which is convexly opposed to an arcuate margin of the chamber to effect the desired light ray ingress blockage.

Some embodiments of the present invention may provide walls of a storage chamber housing thereof as shaped sheeting of any suitable material, such as metal, or parts or elements thereof as die-castings of suitable metal or as bodies molded from suitable thermoplastic or thermo-setting synthetic resin composition, such as a high-impact polystyrene. It is advantageous to face at least some more critical parts of embodiments of cassette structures of the present invention, including the inner side face of the first lip and its raised land, the back side and concave face of the tip member swingably supported by the inward end of the second lip and the inner side face of the latter with friction reducing means. For this purpose, such surfaces may be provided with a friction reducing means, such as a raised pattern or embossing, to define thereon contact-localizing areas of limited extent, or with the nap of flocked fibrous material in sheet or strip form. One may prefer to satisfy this requirement by lining or covering them with sheeting or strips of suitable light impervious, dark-colored or black felt, velour or flock paper having a nap or friction reducing pattern on its outside face. It may be preferable for this purpose to employ sheet composition formed of matted long fibers appreciably compacted together. The procedural installation thereof may be simplified and greater exactitude in placement realized by employing a continuous flexible strip of the light-excluding fibrous material with consecutive sections thereof covering in order the inner side face of the first lip including its raised land, the surface of the shallow recess, the arcuately curved inside face of the housing sidewall around to the rear of the swingable tip member, the back side of the latter and its concave face, and finally the inner side face of the second lip. Such a light trap strip should be somewhat wider than the freshly cut film to be housed in the cassette. For example, a cassette housing designed to store 16 mm. film may be equipped with such a strip of about 16.1 mm. in width.

Regardless of whether a single flexible strip of the light-excluding fibrous material is employed only to face the inner side face of the second lip and the concave face of the swingable tip member with a second such strip facing the shallow recess and the inner side face of the first lip and, if desired, the adjacent shallow recess, or a single strip is employed to face all of these surfaces and additionally the intervening arcuately curved inside face of the housing sidewall, terminal ends of the strip facing the inner side face of the second lip will be intervened by an intermediate section which is doubled back upon itself to define a flexible free loop having a transverse bight fold therein with one end portion of the loop anchored to the arcuately curved inside face of the sidewall at a point of anchorage back of the second lip and the other loop end portion anchored to the second lip, so that the flexible free loop serves as the swingable tip member with its bight fold defining the inward end edge thereof. Areas of the back side of any such strip may be fixed and terminal ends thereof anchored to cassette surfaces which they cover by suitable cement, but in any event areas of the opposed back sides within the loop section need not be cemented together and the flexing of the loop in the biasing of it radially outward by the turns of the film roll indicate that it would be preferable to permit them to slide relative to each other at least during the initial flattening and shaping of the loop, thereafter to serve as the light rays blocking tip member.

Locating the major portions of the slot-defining surfaces of the lips and of the cooperating tip member within each of the chambers of double chamber cassette structures is important to the efficient use of the latter since excessive extensions of the outside ends of the lips, which is characteristic of many prior art double chamber cassettes, is thereby avoided. Thus a longer length of the raw stock film in the gate intervening the opposed slot-defining lips of the supply and take-up chambers is provided for exposure to the light rays focused thereon by the camera lens to register in the film emulsion an imaged frame. The bigger the area of the raw stock film on which an image is to be registered the better is the resolution therein. And it is important to avoid desired attainment of the bigger area by increasing the film width, particularly with respect to the smaller film sizes such as 16 mm. or 9 mm., since such increased widths require greater depths of cassette chambers that will occupy greater space within the cameras and desired miniaturization dictates minimizing the space within the camera occupied by all parts. Also, it has long been accepted that small width films, such as those which are 9 mm. wide commonly used Minox cameras, have their edges fogged after exposure thus reducing the effective area for registration of images thereon. This is partly due to the inadequacy of the light traps at the edges of film passage slots which becomes exaggerated by the effects of low humidity. Film responds to conditions of relatively low humidity by curling of the edges toward the emulsion side to concave the latter since the emulsion contracts in environments of low humidity. The optimum for maintaining raw stock film substantially flat is an environment of about 50–60% humidity and is seldom met in storage of film in stores and in the hands of customers. Such curvature reduces the effective width of the negative film. Light traps of the present invention effectively avoid these difficulties as will be more fully understood from the following descriptions of preferred embodiments of the present invention.

Advantageous features of the present invention may also be realized in supply cassettes for greater width films, such as 35 mm. For this purpose the circumambient sidewall of the cassette may be molded as a springy, light-impervious, C-shaped shell structure with one end shaped to provide the first lip in the inner side face of which is defined the convexed land and the adjacent shallow recess and with the other end shaped to define the second lip and its inwardly projecting and concaved, swingable tip member. Such springy C-shaped shell may be conveniently molded from compacted fibrous material, e.g., papier-mâché. The inside surfaces of such molded C-shaped shell with its swingable tip member light trap will serve effectively in providing an adequate light trap. This C-shaped structure can be sprung radially inward to generally cylindrical form so that the concave face of the tip member of the second lip is opposed to the convexed surface of the land embodied in the inner side face of the first lip and this constricted shape may then be maintained by telescoping over at least one of the end margins thereof the depending skirt or edge flange of a generally circular end cap or cup properly shaped to a required minor degree at the lapping lips. Two such end caps or cups may be employed to close opposite ends of the chamber defined within the C-shaped shell. The swinging mount of the concaved tip member by the second lip may be attained by thinning out the connection thereto of the inner end of this lip to provide appreciable flexibility in the connection. Also, such swinging mount may be provided by thinning out the connection of the housing sidewall to the second lip, or by providing in relatively thin section the second lip-defining portion from the point of connection thereto of the housing sidewall through to the point of connection of the inward end of the second lip to the tip member.

Brief description of the drawings

Other objects of the invention will in part be obvious and will in part appear from reference to the following detailed description taken in connection with the accompanying drawings, wherein like numerals identify similar parts throughout, and in which:

FIG. 1 is a top end view of an embodiment of a double chamber cassette of the present invention, with parts broken away for clarity of disclosure, and diagrammatically illustrating the position of such cassette relative to the lens of a camera and light rays transmitted thereby to the path of the film through the gate to indicate a longer film section exposed in the taking of each picture than is attainable by prior art versions of such double chamber cassettes;

FIG. 2 is a plan view to greatly enlarged scale of the supply chamber of the cassette structure shown in FIG. 1 with the top end wall removed, depicting a plurality of turns of raw stock or negative film therein and diagrammatically indicating the effectiveness of the blockage of light rays emanating externally and directed into the mouth of the film passage slot;

FIG. 3 is a perspective view to still larger scale, with parts broken away, of the film passage slot structure shown in FIG. 2;

FIG. 4 is a plan view to about half the scale of FIG. 2 of one embodiment of a flexible strip of light-impervious material which is employed in the FIGS. 2 and 3 structure to form the light trap thereof;

FIG. 5 is a greatly enlarged sectional view, with parts broken away, taken substantially on line 5—5 of FIG. 2;

FIG. 6 is a side elevational view, with parts broken away, of another embodiment of the present invention;

FIG. 7 is a sectional view taken substantially on line 7—7 of FIG. 6;

FIG. 8 is a perspective view, with parts broken away, of the chamber sidewall structure of the FIGS. 6 and 7 embodiment as it is initially formed; and FIG. 9 is an edge view of the sidewall structure shown in FIG. 8, indicating the relative positions of parts after the sidewall structure of FIG. 8 is constricted to generally cylindrical form and then at least capped over at one end to hold it in such form.

Description of preferred embodiments

Referring to the drawings, in which like numerals identify similar parts throughout, it will be seen that one embodiment of the present invention, as illustrated in FIGS. 1 to 5, inclusive, may consist of a supply housing 10 and a takeup housing 11 suitably rigidly connected together by a cross bar 12. By way of example, the circumambient sidewalls and the generally circular bottom end walls of the supply and take-up housings 10 and 11 may be of suitable construction molded from high impact polystyrene or similar plastic material, the tying cross bar 12 also preferably being molded integral therewith, such as in the form of a laterally extending strap projecting from opposed portions of the bottom end walls of these cassette housings.

FIGS. 1, 2 and 3 illustrate, for example, that supply housing 10 is in the form of a closed-bottom shell having a circumambient or generally cylindrical, light-impervious sidewall 13 closed at its bottom end by a generally circular, transversely-extending, light-blocking end wall 14 molded integral therewith. The sidewall 13 is provided with an exterior, generally circular shoulder 15 against which the lower edge of a circuitous skirt of a light-blocking cover cap or cup 16 may seat when telescoped down over the generally circular top end margin 17, to define therein a generally cylindrical, closed film storage chamber 18 having an arcuately curved inside face 19.

A longitudinally-extending gap or slot in the sidewall 13 is provided between a pair of opposed, circumferentially-spaced, longitudinally-extending first and second lips 20 and 21 which respectively have opposed inner side faces 22 and 23 defining therebetween a longitudinally-extending film passage slot leading from the exterior of the housing 10 to the chamber 18. As will be best understood from FIG. 2, the inner side face 22 of the first lip 20 extends generally tangentially from and is merged with curved inside face 19 of the chamber 18.

The first lip 20 has embodied in the inner side face 22 thereof a longitudinally-extending, transversely-convexed, relatively wide raised land 24 with its sloping inward side located within the chamber 18 and defining with the curved inside face 19 of the sidewall 13 at the mergence thereof a longitudinally-extending, shallow recess 25. The inner side face 23 of the second lip 21 is opposed to and spaced from a longitudinal zone of the convexed surface of said land 24 with the film passage slot defined therebetween. This slot has a flared mouth 26 at its outer end and a constricted throat inwardly of the latter, indicated by the broken line 27 in FIG. 2.

A facing of flexible, light-impervious strip material is provided in the FIGS. 2 and 3 embodiment preferably by a continuous strip 28, shown in plan view in FIG. 4, which may be of fibrous material having a napped surface 29. For the purpose of anchoring the terminal ends of this flexible strip 28 the outer side of the first lip 20 is rabbeted at 30 and a similar rabbet 31 is provided on the exterior side of the second lip 21.

As is indicated in FIG. 4 the flexible strip 28 of fibrous material has terminal end sections 32 and 33 respectively defined from the main body of the strip by transverse fold lines 34 and 35, indicated by broken lines. These transverse fold lines 34 and 35 preferably are guided by removing the tip corners of the strip 28, such as by cutting them off at an angle of, e.g., of about thirty degrees (30°), to provide at opposite ends oblique corner edges 36 and 37, as will be seen in FIGS. 3 and 4. The guidance provided by the removal of the tip corners of the terminal ends of the facing or lining strip 28, such as by cutting them off along the oblique lines 36 and 37, is important to the ready and proper installation of such strip within the cassette chamber 18, since normally this is a manual operation. After the strip 28 has been folded transversely along the line 34 the back face of the terminal end section 32 may be suitably cemented into the longitudinally-extending rabbet 30 and then successive sections thereof draped against the inner side face 22 and its raised convexed land 24 of the first lip 20, then back across the shell recess 25 and progressively along the arcuately curved inside face 19 of the sidewall 13 with continuous or selective anchorage to these surfaces by cement to a point of anchorage, the approximate location of which is indicated at 38 in FIG. 2 back behind the second lip 21. A loose loop 39 will then be defined in this strip, such as by employing a notch 40 in one side edge of the strip 28 as guidance and forming a transverse fold line 41 therein, as will be seen from FIGS. 1 and 4. One end portion of this loose loop section 39 will be suitably anchored, such as by cement, in the vicinity of the anchorage point 38 and then the section of the strip beyond the fold line 41 will be drawn out through the slot mouth 26 to cover the inner side face 23 of the second lip 21 and to lap at its fold line 35 back into the rabbet 31 for cement anchorage.

In order to understand the functions of the parts illustrated in FIGS. 2, 3 and 4 let it be assumed that there is housed within the supply chamber 18 a roll 42 of raw stock or negative film consisting of a plurality of successive turns. Due to the inherent springiness of such film each such turn tends to expand or unroll and thus the slick side of the outer turn 42–1 is snugged against the napped face of the lining strip 28 with which the arcuately curved inside face 19 of the sidewall 13 is covered substantially around to the point of loop anchorage 38. This outside turn will bear against the loose loop 39 substantially along a radial line where the section of FIG. 5 was taken, to bear against the back side of this loop substantially along a longitudinally-extending line at 43. Each of the inner turns, such as 42–2 and 42–3, will successively bear substantially along this radial line against the turn outward thereof, so that appreciable biasing force is applied at 43 to the back side of the loose loop 39. Consequently, the loose loop 39 will be crushed to substantially flat form, as is indicated in FIG. 2, between the inside face or emulsion side of the terminal end portion 420 of the outside turn 42–1 which extends out through the throat 27 and mouth 26 of the film passage slot, in the manner indicated in FIG. 2. As a result, the loose loop 39 in this flattened condition now constitutes a flexible or swingable, inwardly-directed tip member 139 extending into the chamber 18 from the inside end of the second lip 21, with its outer face 44 snugged thereagainst being concaved in shape. It will also be noted from FIG. 2 that the bight fold 41 extends to the vicinity of the shallow recess 25, so that the terminal end of this tip member 139 extends across and behind the throat 27 of the film passage slot, to block off all light rays which may otherwise tend to enter through the mouth 26 and throat of this slot. There is diagrammatically indicated in FIG. 2 a bundle of light rays 45 which tend to enter the mouth 26 of the film passage slot, indicating how they are blocked off effectively by this concave tip member 139.

In the greatly enlarged sectional detail of FIG. 5 is illustrated the probable action of parts in blocking off light rays along the edges of the terminal portion 420 of the film exiting from the film passage slot. Since the strip 28 of fibrous material is of a width greater than the film or its successive turns 42–1, 42–2 and 42–3, etc., marginal edges of the crushed loop constituting the tip member 139 will lap beyond the edges of the film substantially to light-blocking association at 46 with the nap on the face 29 of the section of the strip which overlies the inner side face 22 of lip 20 and its convexed land 24.

While the supply housing 10 and the take-up housing 11 are of generally similar construction, particularly with reference to novel features of the present invention, they do differ in minor detail not pertinent herein. The take-up housing 11 is of larger diameter than the supply housing 10 and thus the similar lips between which the film passage slot is defined are respectively referenced 120 and 121 in FIG. 1. The circumambient or generally cylindrical sidewall of take-up housing 11 is identified therein as 113 with the circuitous shoulder arranged thereabout being referenced 115. The top cover cap 116 is desirably equipped with a central hole 47 for the take-up spool drive with conventional provision for blocking ingress of light thereat. If the chambered housing 11 is to be of the injection type the top cover cap has no central hole, but in such case at least one marginal zone of the film must be equipped with a series of driving sprocket holes. The loose loop 39 of fibrous strip material, with which the take-up chamber housing 11 is equipped is of the same type as is provided in the supply housing 10 prior to the crushing thereof by successive turns of the roll of film 42 to convert it into curved tip member 139.

FIG. 1 illustrates how the foreshortening of the slot-defining lips and location of the light trap within the cassette chamber desirably lengthen the frame of each image. As is therein indicated the camera lens will be located at about the position L relative to the double chamber cassette 10–11. Prior art cassette constructions usually project the lips so that the portion of the film exposed to the rays transmitted by the camera lens at position L will extend about the distance A between the opposed sides of the supply and take-up housings 10 and 11. The foreshortening of the slot-defining lips 20 and 21, and 120 and 121 in accordance with the present invention increases this length of film for exposure to about the distance B. Thus a greater area of the negative is exposed to the rays transmitted by the camera lens at L when each frame image is registered in the emulsion of the raw stock or negative film for effectively increasing the resolution.

The embodiment illustrated in FIGS. 6 to 9 inclusive is particularly designed for wider film, e.g., 35 mm. film, which is provided with rows of successive sprocket holes along its marginal edges. Such a chambered housing 100 constitutes the supply housing in which is stored the roll of raw stock film for insertion into the camera. The terminal end of the film, such as that indicated at 1420, is drawn out through the film passage slot for spooling about a suitable take-up spool located in the camera. After the raw stock negative has been completely exposed with spooling thereof upon the take-up spool the exposed film is then translated reversely back into the chambered housing 100 for removal from the camera and development. For this purpose one end cap 216 is provided with a central hole 48 (FIG. 9) through which a projecting end 49 of a rotary core 50 for engagement to effect the reverse winding of the exposed film with suitable provision for blocking ingress of light, as is well understood in the art.

In accordance with the present invention the curvilinear sidewall 213 of the cassette housing 100 may be compression molded from fibrous material, such as papier-mâché, highly compacted in the molding thereof. When initially molded, as is illustrated in FIG. 8, such circuitous side-wall 213 is C-shaped, thereafter to be sprung by constriction into generally cylindrical form as is illustrated in FIG. 9. Such diametric constriction is then maintained by telescoping over at least one end margin of this constricted sidewall at least one of the end caps, such as 216, and preferably by capping over both end margins respectively by end caps 214 and 216. In the telescoped positions of the end caps 214 and 216 the inner edges of their skirts 51 and 52 will be spaced apart at least a distance slightly greater than the width of the film, to leave uncovered the film passage slot between the opposed lip ends of the constricted sidewall body 213.

As will be understood from FIGS. 7, 8 and 9 one terminal end of the C-shaped molded sidewall body 213 is shaped to provide a first lip 220 which is similar in face contour to the lip 20 of the embodiment of the FIGS. 1 to 5 inclusive, having an inner side surface 22 in which is embodied a convexed land for the purpose previously indicated. The other end of the C-shaped body 213 is contoured to provide the opposed second lip 221 with its inner side face 223 opposed to a longitudinal zone of the convexed face 222 of the first lip 220. The inward end of the second lip 221 carries as an inwardly-extending extension an integral tip member 239 provided with a concave face 244 opposed and radially spaced from the convexed face 222 of the first lip 220 when this C-shaped body is in the constricted condition of FIGS. 7 and 9. The terminal end 241 of the tip member 239 preferably is rounded off, as is shown in FIGS. 7, 8 and 9 for facilitating drag or slippage thereagainst of the emulsion side of the outside turn 142–1 of the roll of film 142 housed within the chamber defined within the cassette 100 and the slick side of the next succeeding turn 142–2. This next succeeding turn 142–2 will thus have a twin line bearing against the inward back face of the tip member 239, substantially at the points 43 and 53 indicated in FIG. 7, for biasing this tip member radially outward toward the convexed face 222 of the lip 220, against the emulsion side of the terminal end 1420 of the film which is being drawn out through the film passage slot defined therebetween. In order that such biasing by successive turns of the roll of film 142 within the housing chamber will provide the desired snugging function between the tip member 239 and the first lip 220 this tip member is swingably mounted through the second lip 221 to the circuitous sidewall 213. While such swinging action may be provided by thinning out the integral connection between the inner edge portion of the second lip 221 and the head end of the tip member 239 it may be preferred to thin out the thickness of this terminal end of the C-shaped molded body 213 through the second lip 221 and its shank to connection of the latter with such curvilinear sidewall, as is illustrated in FIGS. 7, 8, and 9.

In order to avoid any latent tendency for the sprocket holes in the edge margins of the film to catch against the tip end 241 the opposite ends 54 thereof preferably are shaped to provide tapered or conical tips in the molding operation, as is indicated in broken lines in FIG. 6.

It will be best seen from FIGS. 7 and 9 that where each of the end caps 214 and 216 has their respective side skirt 51 and 52 telescoped over the opposed lips 220 and 221 such skirts are suitably shaped, such as is indicated at 55, to fit down over the noses of these lips, as is best seen in FIGS. 7 and 9.

The details of operation of the embodiment illustrated in FIGS. 6 to 9 inclusive will be apparent from the preceding description of the operational functioning of the equivalent parts of the embodiment illustrated in FIGS. 1 to 5 inclusive.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is the novel subject matter defined in the following claims.

I claim:

1. In a photographic film cassette a housing comprising:
  (a) a circumambient, light-impervious sidewall having axially-spaced, generally circular end margins and an arcuately curved inside face defining therein a generally cylindrical chamber of an axial depth between its end margins greater than the predetermined width of a strip of negative film to be stored therein as a spiraled roll of successive turns thereof;

(b) a pair of axially-spaced and opposed, generally circular, transversely-extending, light-blocking end walls connected to the axially-spaced end margins of said sidewall and closing off in light-tight manner the opposite ends of said chamber;

(c) a pair of circumferentially-spaced, opposed and longitudinally-extending first and second lips embodied in said sidewall and having opposed inner side faces defining therebetween a longitudinally-extending film passage slot leading from the exterior of said housing to said chamber with the inner side face of said first lip extending generally tangentially from and merged with the curved inside face of said chamber; and (d) a roll of such negative film strip comprising at least one rolled up outside turn thereof housed in said chamber with said turn having a natural recovery characteristic tending to unroll it when unconfined which biases it radially outward against the arcuately curved inside face of said chamber sidewall and toward structure of said slot-defining lips opposed to said turn within said chamber, said turn of film strip having a terminal end portion projecting out through said slot; wherein the improvement comprising:

(1) a longitudinally-extending, transversely-convexed, relatively wide raised land embodied in the inner side face of said first lip with its sloping inward side located within said chamber and defining with the curved inside face of said sidewall at the mergence thereof a longitudinally-extending, shallow recess;

(2) the inner side face of said second lip being opposed to and spaced from a longitudinal zone of the convexed surface of said land with the film passage slot defined therebetween, said slot having a flared mouth at its outer end and a constricted throat inwardly of the latter out through which the terminal end portion of said film strip turn extends; and (3) a longitudinally-extending, inwardly directed, swingable tip member of a longitudinal width at least equal to that of said film and mounted upon the inward side of said second lip, said tip member having a concave face arranged generally complementary to the sloping inward side of said convexed land with the inward end edge of said tip member extending inwardly at least to the vicinity of a portion of said shallow recess;

(4) said terminal end portion of said film strip turn being located between the opposed faces of said first lip and its raised land and of said second lip and the concave face of the tip member of the latter with another portion of said turn within said chamber bearing against the back side of said tip member opposite its concave face, thereby swinging said tip member toward said opposed convexed land and biasing its concave face snugly against the intervening end portion of said film strip turn, said twing tip member extending across and behind said slot throat and thus blocking off ingress of light rays into said chamber through said slot.

2. The cassette as defined in claim 1 in which is provided a flexible strip of light-excluding material having terminal ends with a section intermediate its ends being doubled back upon itself to form a flexible free loop having a transverse bight fold therein with one end portion of said loop being anchored to the arcuately curved inside face of said housing sidewall at a point of anchorage back of said second lip and the other end portion of said loop being anchored to said second lip, said loop serving as said swingable tip member with the bight fold thereof defining the inward end edge of said tip member.

3. The cassette as defined in claim 2 in which said flexible strip includes sections covering the inner side face of said first lip including its raised land, the surface of the shallow recess, the arcuately curved inside face of said housing intervening said shallow recess and said swingable tip member and the inner side face of said second lip, thereby providing a continuous facing which is formed of consecutive sections of said strip.

4. The cassette as defined in claim 3 in which said strip includes a pair of first and second end sections flanking opposite end portions of said loop section with said first strip end section terminating in one of said strip terminal ends and with the latter anchored to said first lip exterior of said slot, said first strip end section extending back through said slot into said chamber with the back side thereof being fixed successively to the inner side face of said first lip including the surface of its land, the surface of said recess and the inside face of said housing sidewall around to the point of loop anchorage on the latter face with connection thereat to one end portion of said loop section, said second strip end section extending from connection to the other end portion of said loop section along the inner face of said second lip out through said slot to the other strip terminal end and with the latter anchored to said second lip exterior of said slot.

5. The cassette as defined in claim 4 in which one side edge of said flexible strip within the loop section is provided with a relatively shallow and small, fold-guiding notch at the bight fold-defining end edge of said tip member, each of the anchored terminal ends of said strip having the corners thereof removed back to a transverse line of folding where said strip is lapped about the exterior end of the lip to which it is anchored, said side notch preventing transverse distortion of the bight fold upon end wall closure of said chamber.

6. The cassette as defined in claim 1 in which said housing sidewall is molded as a springy C-shaped element constrictable to generally cylindrical form, at least one of said housing end walls being in the form of a generally circular cup having a generally cylindrical sidewall telescoped over one of the end margins of said sidewall and holding the latter constricted to generally cylindrical form, said pair of slot-defining lips being molded integral with said sidewall and the tip member of said second lip being in the form of an integral curved extension of the inside end of this lip.

7. The cassette as defined in claim 6 in which said second lip and its integral tip member are swingable together, the connection between said second lip member and said housing sidewall being relatively highly flexible to provide such swing of said tip member toward said opposed convexed land of said first lip.

8. A light-impervious lining for a photographic film cassette housing that comprises:

(a) a circumambient, light-impervious sidewall having axially-spaced, generally circular end margins and an arcuately curved inside face defining therein a generally cylindrical chamber of an axial depth between its end margins greater than the predetermined width of a strip of negative film to be stored therein as a spiraled roll of successive turns thereof;

(b) a pair of axially-spaced and opposed, generally circular, transversely-extending, light-impervious end walls connected to the axially-spaced end margins of said sidewall and closing off in light-tight manner the opposite ends of said chamber;

(c) a pair of circumferentially-spaced, opposed and longitudinally-extending first and second lips embodied in said sidewall and having opposed inner side faces defining therebetween a longitudinally-extending film passage slot leading from the exterior of said housing to said chamber with the inner side face of said first lip extending generally tangentially from and merged with the curved inside face of said chamber, said opposed and spaced apart lips having exterior tip ends with the distance from one thereof along the adjacent inner face lip and progressively about the inside face of said sidewall to the other lip inner face and across the latter to such second lip exterior tip end being of certain dimension;

(d) the exterior surface of said sidewall adjacent the outer tip ends of said lips being provided with transversely-extending rabbets into which terminal ends of a strip of the lining may be anchored; the improvement comprising:

an elongated flexible strip of light-impervious material to serve as the lining for said housing which is of a width greater than said strip of negative film and less than the depth of said chamber and which has a pair of transversely-extending terminal ends with the strip therebetween being appreciably longer than said interior distance from one lip exterior tip end to the other lip exterior tip end, such strip being provided adjacent each of its terminal ends with a transverse line of fold with corners of this terminal end being removed to the line of fold for dictating the location of the latter, the terminal end section defined beyond this line of fold being adapted for anchorage in one of said rabbets, the remainder of said strip intervening said transverse lines of fold at the terminal end sections being subdivided into a relatively short section and a relatively long section by a transverse fold line dictated by a relatively shallow and small, fold-guiding notch in one side edge of said strip, the length of said strip which is in excess of said distance between lip tip ends providing within said chamber, when said lining strip is arranged through said slot for facing said lips and the inside face of said side-wall, an elongated double-backed flexible loop at the inward side of said second lip having a transverse bight fold of which the location is dictated by said side notch.

References Cited

UNITED STATES PATENTS 3,147,681  9/1964  Sanderson _____ 95—31

NORTON ANSHER, *Primary Examiner.*

D. B. WEBSTER, *Assistant Examiner.*

U.S. Cl. X.R.

95—31; 242—71.2